T. A. FORSYTH.
HOSE.
APPLICATION FILED SEPT. 8, 1915.
1,205,984.
Patented Nov. 28, 1916.
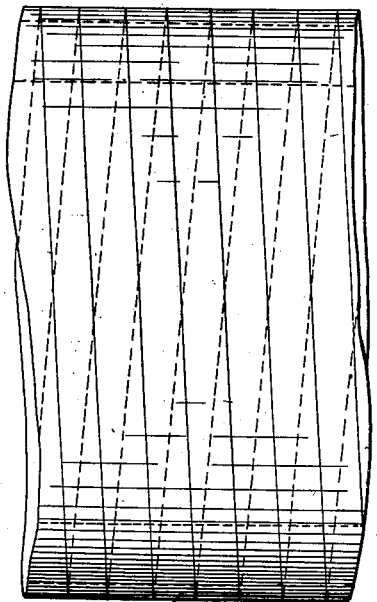
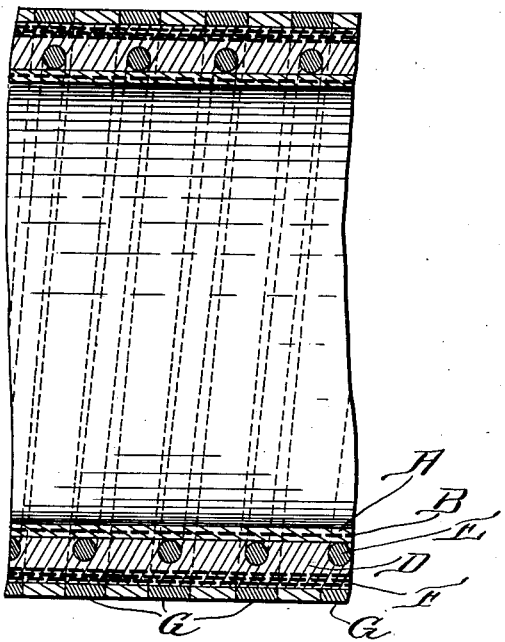
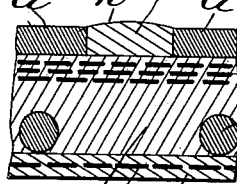
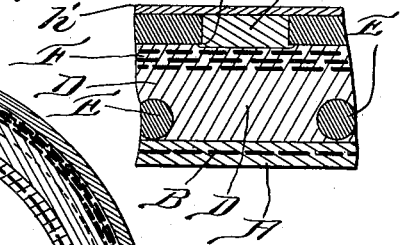
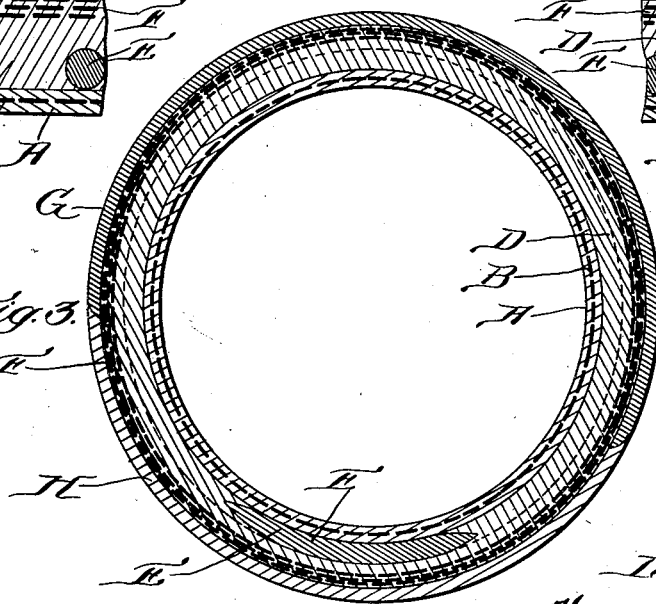
Inventor:
Thomas A. Forsyth
by George A. Rockwell,
Atty.

UNITED STATES PATENT OFFICE.

THOMAS A. FORSYTH, OF BOSTON, MASSACHUSETTS, ASSIGNOR TO BOSTON BELTING COMPANY, OF BOSTON, MASSACHUSETTS, A CORPORATION OF MASSACHUSETTS.

HOSE.

1,205,984.  Specification of Letters Patent.  Patented Nov. 28, 1916.

Application filed September 8, 1915. Serial No. 49,598.

*To all whom it may concern:*

Be it known that I, THOMAS A. FORSYTH, of Boston, in the county of Suffolk and State of Massachusetts, have invented a new and useful Hose, of which the following is a specification.

My invention relates to hose and in the preferred form to hose useful for suction and discharge.

Discharge hose has to withstand only internal pressure and its walls do not need any provision to keep them round. If such hose collapses, no harm is done, as the walls will assume their round form when any internal pressure is exerted.

Suction hose has to stand an external pressure and the walls of such hose must have sufficient rigidity to maintain always a round shape.

Hose for suction and discharge needs to have all the properties of suction hose, but it needs also to have great strength to withstand an internal bursting pressure.

My invention is especially adapted for suction and discharge hose in large sizes. It needs to have great strength, in fact more strength than is usually given by the layers of duck. It also needs to have its surface able to withstand great cutting and chafing without injury, as the hose is often dragged over sharp rocks and coral reefs at the bed of the ocean.

An ordinary suction hose, that is, either of the smooth bore type or of the common type with wire exposed in the bore, is vulcanized and then is wound with wire or other protecting armor on the exterior. One great objection to these types is that dragging the hose over rocks distorts the wire, crowding some of the spirals together and leaving large open spaces elsewhere and this is also true if the hose is bent to a large extent. The result is that large spaces are had between the coils of the wire and at these points there is great danger of collapse particularly in large sizes of hose, in which the clinging ability of the wire is very small. In my new hose as soon as the rubber hose is put together and is ready to be vulcanized, but before vulcanization I wind wire on it, or preferably coil the wire in a helix and draw it on over the hose tightly, and then fill in the space between the wire with unvulcanized rubber to a height a little above the wire. I then wrap the hose with cloth and vulcanize it in the usual manner. It is desirable that the strips between the wire extend above the wire so that the rubber, as it becomes plastic by vulcanizing, will flow under the wire by reason of the pressure of the cloth and make a solid mass. When vulcanized and the cloth is removed, a hose is obtained on which this outside wire is firmly united to the rubber. Any kinking, bending, stretching or dragging or chafing will not change the position of the wire. The spaces between the coils will remain just as made, and this reinforces the rubber or rubber and duck and the walls of the hose so that an enormous internal pressure can be withstood. The surface of this hose is thoroughly armored with metal against chafing and still retains the flexibility of the hose. The union of the metal to the rubber, first because the rubber adheres to the metal, and second, because the strips have flowed under the edges of the wire, so thoroughly anchors the rubber walls to the wire that resistance to collapsing is also accomplished.

I show an illustrative embodiment of my invention in the drawings in which—

Figure 1 is an elevation of a portion of a hose embodying my invention. Fig. 2 is a central longitudinal section thereof; Fig. 3 is a transverse section thereof; Fig. 4 is an enlarged detail illustrating the spacing rubber before vulcanization; and Fig. 5 is an enlarged detail illustrating the spacing rubber after vulcanization.

At the inside of the hose is a rubber tube A with insertion B of duck. Outside of tube A is rubber tube D having embedded in it a coiled wire E. Duck insertion F is also provided in tube D. Outside of tube D is a helical metal coil G. Rubber H is applied to fill the spaces between the coils and preferably extends outward beyond coil G as shown at *h* in Fig. 4. Then a cloth *h'* is wrapped tightly around the hose and rubber H is vulcanized. During vulcanization rubber H becomes plastic and is pressed inward so as to be approximately flush with coil G and the inner portions of rubber H flow in between coil G and tube D as indicated at $h^2$ in Fig. 5 thus anchoring the coil G to tube D.

I point out in the appended claim the essential features of my invention.

What I claim is:

A suction and discharge hose comprising a body portion; a metal collapse-resisting coil around the exterior of said body portion; and rubber around the exterior of said body portion and filling the spaces between the coils, said rubber being vulcanized to the body portion and to said coil and entering between the coil and said body portion.

THOMAS A. FORSYTH.